(12) United States Patent
Carson

(10) Patent No.: US 7,551,102 B1
(45) Date of Patent: Jun. 23, 2009

(54) EMERGENCY VEHICLE WARNING SYSTEM

(75) Inventor: James H. Carson, Indianapolis, IN (US)

(73) Assignee: Carson Manufacturing Company, Inc., Indianapolis, IN (US)

( * ) Notice: Subject to any disclaimer, the term of this patent is extended or adjusted under 35 U.S.C. 154(b) by 245 days.

(21) Appl. No.: 11/457,028

(22) Filed: Jul. 12, 2006

Related U.S. Application Data

(60) Provisional application No. 60/698,590, filed on Jul. 12, 2005.

(51) Int. Cl.
G08G 1/00 (2006.01)
(52) U.S. Cl. .................. 340/902; 340/474; 340/936; 340/937
(58) Field of Classification Search ............ 340/902, 340/474, 936, 937
See application file for complete search history.

(56) References Cited

U.S. PATENT DOCUMENTS

| | | | | |
|---|---|---|---|---|
| 6,100,791 A | * | 8/2000 | Bader et al. ............. | 340/331 |
| 6,668,219 B2 | * | 12/2003 | Hwang et al. ............. | 701/29 |
| 6,973,338 B2 | * | 12/2005 | Isenberg et al. ............. | 600/318 |
| 7,122,976 B1 | * | 10/2006 | Null et al. ............. | 315/362 |
| 2003/0081935 A1 | * | 5/2003 | Kirmuss ............. | 386/46 |
| 2004/0203352 A1 | * | 10/2004 | Hall et al. ............. | 455/41.1 |
| 2006/0176190 A1 | * | 8/2006 | Madison ............. | 340/902 |

* cited by examiner

Primary Examiner—Benjamin C Lee
Assistant Examiner—Ojiako Nwugo
(74) Attorney, Agent, or Firm—Woodard, Emhardt, Moriarty, McNett & Henry LLP

(57) ABSTRACT

A system for controlling the alert and response indictors of an emergency vehicle permits the operation of one alert device, such as a police vehicle lightbar, to automatically initiate the operation of a video camera, thus providing a record of an emergency event without requiring the operator of the vehicle to specifically turn on the camera. The system also provides isolating diagnostic functionality that simplifies system troubleshooting.

25 Claims, 3 Drawing Sheets

EMERGENCY VEHICLE WARNING SYSTEM

REFERENCE TO RELATED APPLICATION

This application claims priority from a Provisional Application Ser. No. 60/698,590, filed Jul. 12, 2005, which is hereby incorporated by reference.

BACKGROUND

Emergency vehicles such as police cars, fire engines, and ambulances, for example, rely on a variety of mechanisms, including sirens and lights, for example, to alert or warn drivers or pedestrians that an emergency vehicles is approaching, or to signal a driver to stop or pull off the road. It is desirable to be able to select and control the operation of these alert mechanisms easily and effectively. It is also desirable to control the operation of video cameras in the vehicle to ensure that an accurate record of personnel actions and activities is available to be used as evidence or in an investigation. Various embodiments and examples described herein provide those features.

SUMMARY

It is therefore an object to describe apparatus and methods for controlling the various alert systems employed by emergency vehicles in order to provide effective ways to warn and notify pedestrians and other vehicles of the emergency vehicle's approach without distracting the emergency vehicle's driver.

It is a further object to describe apparatus and methods for automatically triggering aspects of the alert systems in response to predetermined actions.

It is a further object to describe apparatus of the type mentioned above which provides a troubleshooting arrangement which simplifies services of the emergency equipment.

These and other objects will become apparent from the illustrated drawing and the description of the embodiments.

DETAILED DESCRIPTION

Figure 1:
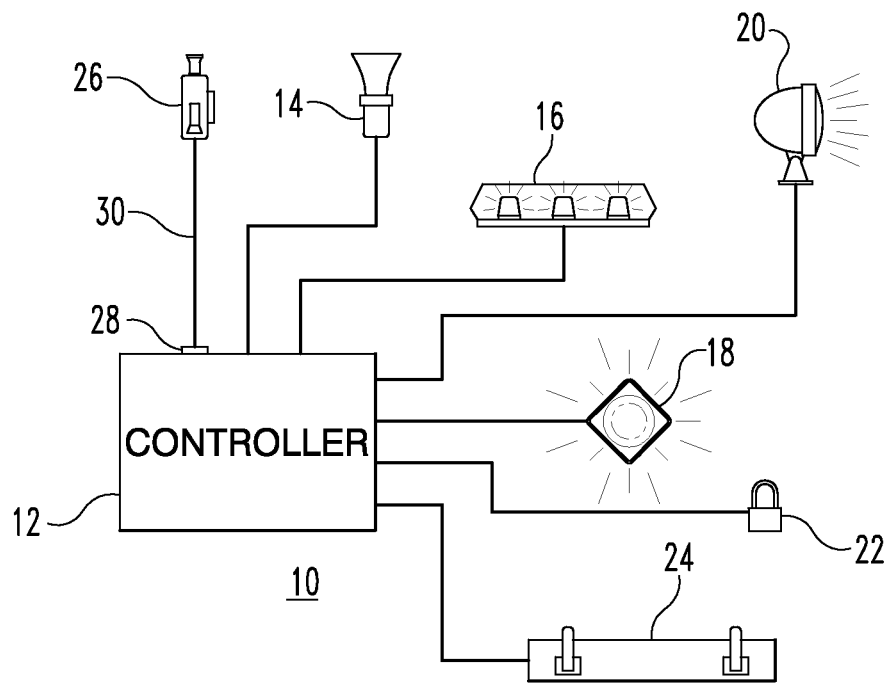
FIG. 1 is a block and schematic diagram of one embodiment of an emergency warning system.

Referring to FIG. 1, there is shown an emergency warning system 10 for a vehicle such as a police car, fire truck, or ambulance, for only a few examples. System 10 is illustratively shown as including a controller 12 which is adapted to control the operation of a number of devices and functions. For illustrative purposes, controller 12 is shown as controlling the operation of siren speaker 14, a lightbar 16, auxiliary strobe lights 18, spotlight 20, trunk lock 22, and gun lock 24. System 10 is also shown as incorporating a video camera 26. Video camera 26, which may also be configured as a combined camera and recorder apparatus, may be mounted within a vehicle, such as a police car, for example, to record traffic stops and officer activity for evidence or investigation purposes. Although video camera 26 may be activated manually, it is desirable to automatically activate video camera 26 under certain conditions so that an officer does not have to remember to turn on video camera 26, or draw his or her attention from an activity that requires full concentration.

To accomplish this purpose, controller 12 incorporates a dedicated output 28 that, in one example, is applied to video camera 26 via wire or cable 30. Output 28 may be factory wired, or programmable by customer, to provide, for example, a video trigger signal that acts to activate video camera 26 in response to one or more actions or conditions. For example, output 28 may be configured to activate video camera 26 whenever auxiliary strobe lights 18 are turned on, when lightbar 16 is turned on, when gun lock 24 is opened, or when some other device is active or some condition is present.

Output 28 therefore provides a high level of flexibility and control for individual police departments, for example, to configure controller 12 to operate video camera 26 in response to the conditions or actions they deem important or desirable. Output 28 may also be configured to record an on-screen display (OSD) on the video camera media that provides information as to the status of various devices or conditions. As only one example, the OSD could provide information as to whether or not an officer has activated the vehicle's siren during a high-speed chase.

In addition to relieving an officer or emergency personnel of the added task of turning video camera 26 on during an emergency situation, an advantage of controllable dedicated output 28 also prevents a police officer from purposely choosing not to activate video camera 26. This feature therefore both protects officers as well as aiding the police or emergency department administration.

Figure 2:
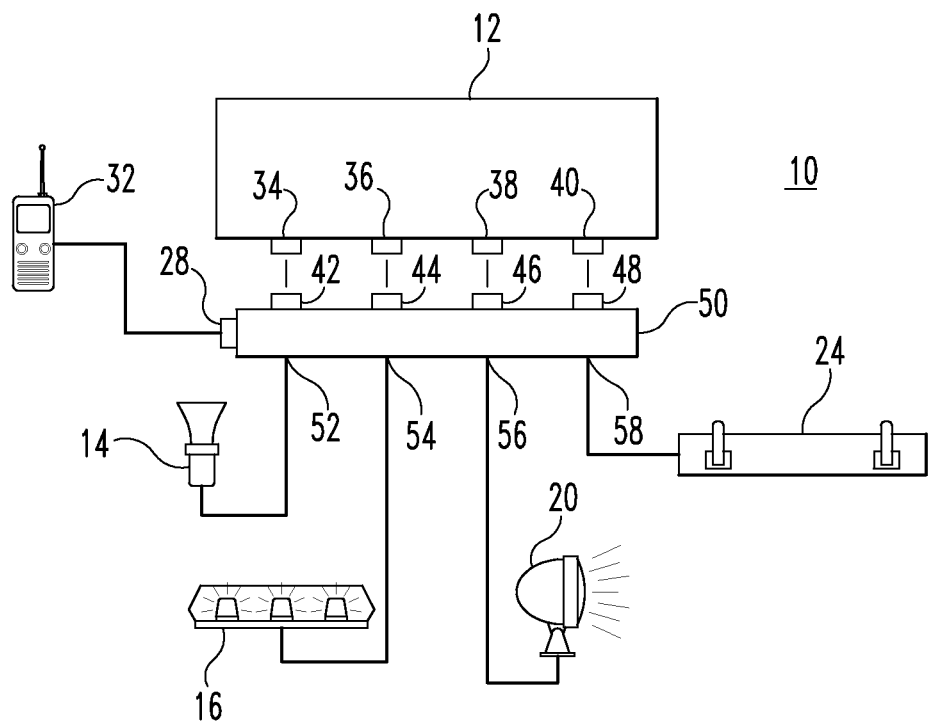
FIG. 2 is a block and schematic diagram of another embodiment of an emergency warning system.

Dedicated output 28 may also be used to control other devices or perform other actions, such as, for example as illustrated in FIG. 2, vehicle radio 32. Output 28 may be configured to automatically turn on radio 32 to enable its immediate use, or to initiate a distress call (in response to gun lock 24 being unlocked, for example). Other devices or actions are of course possible.

FIG. 2 also illustrates one way in which output 28 may be programmed or controlled. LEDs 34, 36, 38, and 40 are shown as being associated with corresponding LED sensors 42, 44, 46, and 48 which are incorporated in program module 50. LED/sensor pair 34 and 42 are shown as illustratively connected to or controlling siren speaker 14 via output 52, LED/sensor pair 36 and 44 control lightbar 16 via output 54, LED/sensor pair 38 and 46 control spotlight 20 via output 56, and LED/sensor pair 40 and 48 control gun lock 24 via output 58. Module 50 may be programmed to activate output 28 in response to any one or more of the LEDs 34, 36, 38 or 40 being on, indicative of the associated device controlled by that particular output also being on. Module 50 is but one illustration of any number of ways that dedicated output 28 may be programmed or controlled, and other methods and mechanisms will be apparent to those skilled in the art.

Figure 3:
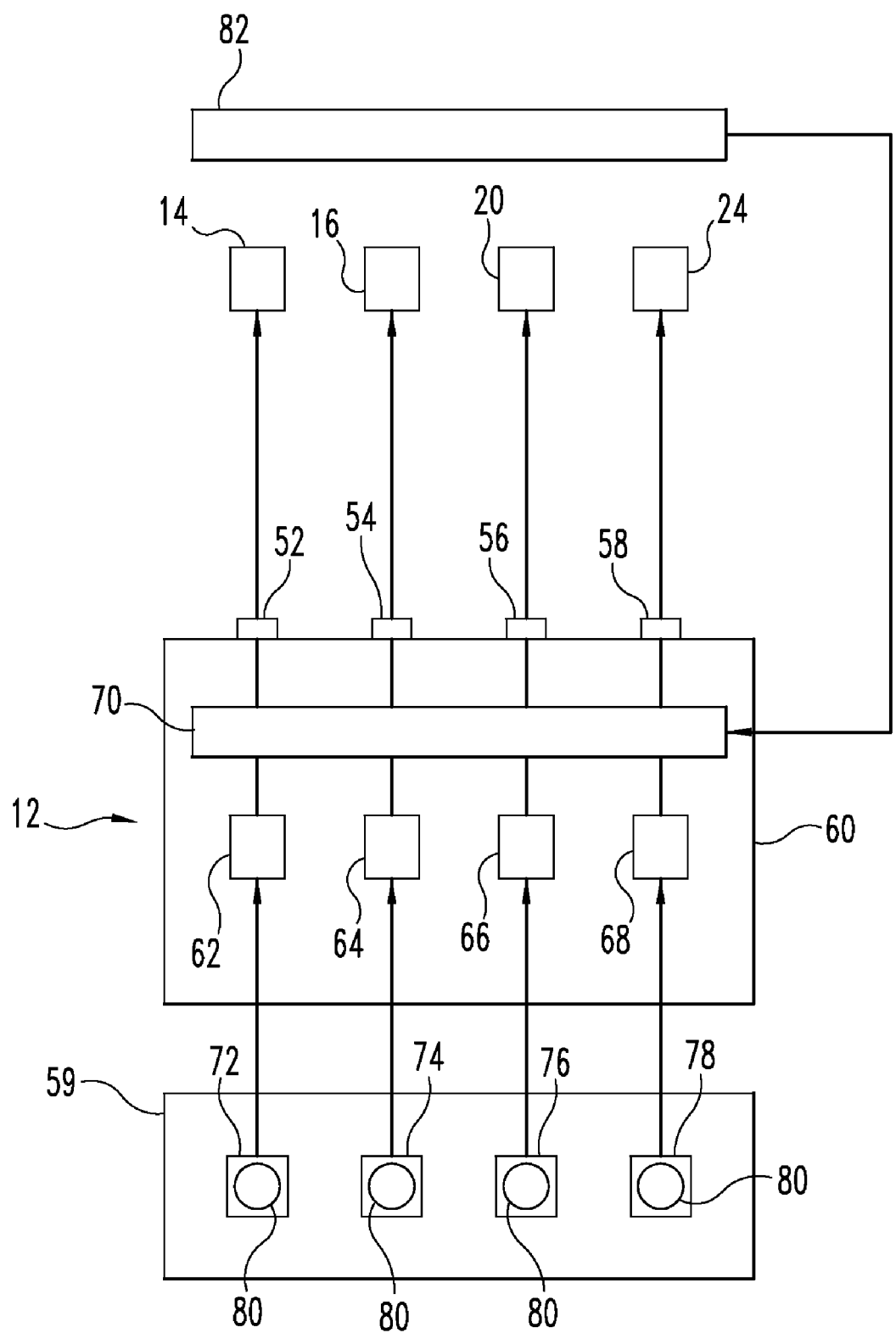
FIG. 3 is a block and schematic diagram of an aspect of another embodiment of an emergency warning system.

FIG. 3, illustrating another aspect of the emergency warning system 10, shows internal circuit board 60 of controller 12. Outputs 52, 54, 56, and 58 are shown as being protected by fuses 62, 64, 66, and 68, respectively. In accordance with the embodiment shown, fuses 62, 64, 66 and 68 are located directly on circuit board 60, prior to the physical connector provided for outputs 52, 54, 56, and 58. Diagnostic circuitry 70 is shown as being located between fuses 62, 64, 66, and 68, and outputs 52, 54, 56, and 58. By locating diagnostic circuitry 70 in this manner, the condition of the output circuits associated with each of outputs 52, 54, 56, and 58 can be directly determined. For example, if lightbar 16 does not operate, but diagnostic circuitry 70 indicates that output 54 is operating correctly, the problem is then isolated to the wiring from controller 12 to lightbar 16 or to lightbar 16 itself. Locating the output fuses internally to controller 12 and monitoring the controller outputs internally as well therefore provides significant troubleshooting information that would not be available if the location of the fuses and the output monitor circuit were external to controller 12. The condition of outputs 52, 54, 56, and 58 can also be viewed on the user interface panel 59 of controller 12. Switches 72, 74, 76, and 78, which are illustratively shown as being configured to control outputs 52, 54, 56, and 58, respectively. Each of the switches is shown as incorporating a visible condition indicator, such as light 80, which may flash in particular patterns, or glow with different colors, depending upon the condition of its respective output. In this way, the officer or other emergency personnel is immediately alerted if one or more fuses have failed or if one or more controller outputs are otherwise disabled.

A sensor device or circuit, illustratively shown as device 82 in FIG. 3, may be used to monitor the condition of the various output devices, such as siren speaker 14 and lightbar 16, for example. Device 82 may employ an audible sound detector, e.g., microphone, for example, to determine if siren speaker 14 is operating, and light sensors to determine if the lights of lightbar 16 are working. Device 82 may be coupled to diagnostic circuit 70, for example, or to another diagnostic circuit, which may then provide an indication, perhaps via lights 80, and audible indicator, or through some other indication mechanism, to provide an external diagnostic function.

Figure 4:
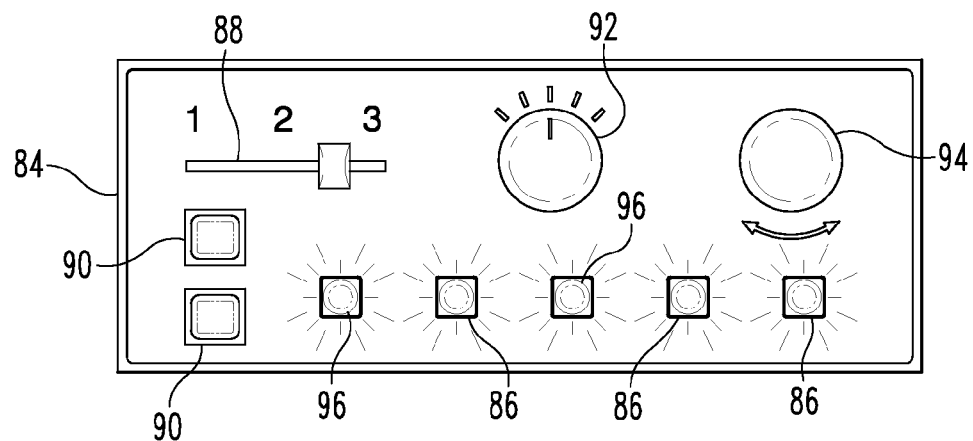
FIG. 4 is a front elevational view of a front panel display of one element of an emergency warning system.

FIG. 4 shows an illustrative front panel 84 which could be used with controller 12, for example. Front panel 84 is illustratively shown as incorporating lighted pushbutton switches 86, lever switch 88, push button switches 90, rotary switch 92, and potentiometer 94, although the types and nature of the various switches are shown for example only, and any type or switch design is acceptable as would be apparent to one skilled in the art. The associated legends or marking are printed or screened directly onto the surface of panel 84. Panel 84 is also illustratively shown as being a membrane switch itself which incorporate the various switch mechanisms for each of the switches and controls previously described, although other types of integrated, splash-resistant switch mechanism are equally acceptable. Panel 84 is illustratively shown as being manufactured of rubber or other flexible material, which incorporates various sealing means, such as shoulders or lips that conform to the various buttons and switches to provide protection against moisture and dirt damaging controls and switches. Panel 84 is thus formed of one piece and includes labeling, switches and lights (e.g., LEDs).

With reference also to FIG. 4, lighted pushbutton switches 86 may be configured by circuitry within controller 12 to program its associated output (or another output if appropriately configured). Switches 86 are illustratively shown as being programmable, but other switches associated with system 10 may also be similarly programmable. In one embodiment, a DIP switch internal to controller 12 is used to enter the "programming" mode of switches 86. Each of switches 86 may then be scrolled through its program choices by successively pushing the selected switch. The program state or status is intuitively displayed by LEDs 96 internal to switches 86, such as a brief flashing of an LED indicating a momentary output (as might be desired for a trunk lock, for example) or a steady light indicating the switch is programmed to turn its associated output on until it is turned off. Failure of a light to operate properly or stay on when pushed may be used as an indication of an output or device failure associated with that particular output.

In another illustrative embodiment, lever switch 88 may be easily programmed, via an internal DIP switch, for example, to operate in a progressive, non-progressive, or partially progressive manner. In a progressive mode of operation, switch position "1" may turn on a set of vehicle lights, e.g., a lightbar, position "2" may add strobe lights, and position "3" may turn on the vehicle's spotlight, for example. In a non-progressive mode, one example may have switch position "1" turning on the auxiliary strobe lights, position "2" turns off the auxiliary strobe lights and turns on the spotlight, and position "3" turns off the spotlight and turns on the lightbar. In a partially progressive mode, one example may enable switch position "1" to turn on the front lights of the lightbar, position "2" turns off the front lights of the lightbar and turns on the back lights of the lightbar, and position "3" turns on the auxiliary strobe lights and both the front and back lights of the lightbar. Other program combinations are of course possible.

It is also possible to program one or more of the buttons 86 on panel 84, for example, to control a number of devices with one button. In this way, certain light and siren combinations could be programmed to be activated via one button, rather than having to push several buttons to activate each of the desired devices or actions. A push button could then be used to perform the function of one or more of the positions of lever switch 88, for example.

Figure 5:
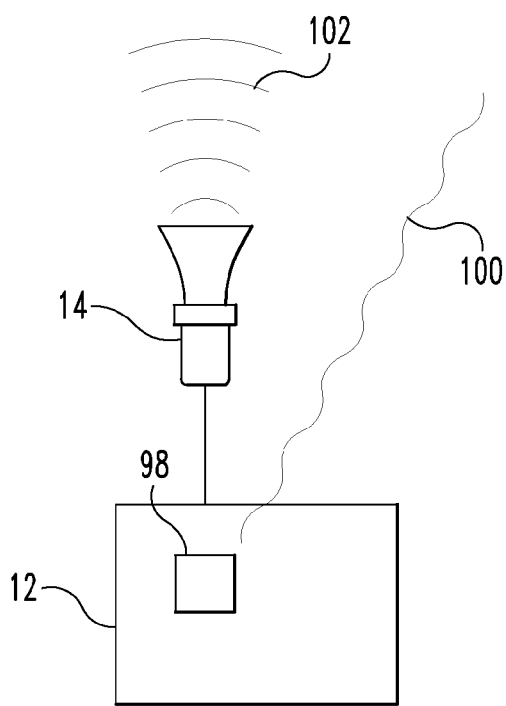
FIG. 5 is a block and schematic diagram of another aspect of an embodiment of an emergency warning system.

In yet another embodiment of system 10, FIG. 5 shows controller 12 as incorporating transmitting circuitry 98 that operates simultaneously with the siren output 102 and/or with certain warning lights to transmit a signal 100 that would be received by receivers in automobiles or other vehicles, for example. This feature or device would then alert the occupants of a motor vehicle that an emergency vehicle is approaching, even if the vehicle's radio volume were set at a high level, or high levels of ambient or environmental noise existed, that would otherwise mask the siren of an approaching vehicle. It is also possible to design the receiver to automatically become activated even if the vehicle's radio or receiver were turned off, or to override an audio output even if a CD player were being used, for example. The receiver may be incorporated into a vehicle's radio or audio system, or as a stand-alone device that could be provided by the vehicle manufacturer or as a aftermarket item. The transmitter associated with device circuitry 98 may be incorporated with the vehicle's siren, it may be a stand alone device, or it could be adapted to use the transmitter of the vehicle's two-way radio, by way of a few illustrative examples.

In another embodiment, controller 12 may operate in wireless configuration, using known technology, such as Bluetooth, for example, or some other known or proprietary technology, thereby allowing much of the circuitry associated with controller 12 to be stored under the seat or in the vehicle's trunk, for example. Controls may be mounted where desired for accessibility, such as being associated with the vehicle's steering wheel.

In yet another embodiment, a electronic siren utilizes multiple output signals that are combined to form the electronic equivalent of a multi-frequency mechanical tone which are traditionally used by fire trucks. Modern fire trucks continue to use mechanical sirens to generate the desired, recognizable harmonic siren sounds. This embodiment would also enable an emergency vehicle to produce a variety of dual siren tones, such as cycling through frequency ranges simultaneously. For example, a first siren tone could be an increasing frequency tone, while a second siren tone could be a decreasing frequency tone.

While the present invention has been illustrated in the drawing and described in detail in the foregoing description, it is understood that such illustration and description are illustrative in nature and are not to be considered restrictive, it being understood that only the preferred embodiments have been shown and described and that all changes and modifications that would be apparent or would occur to one skilled in the art are to be protected.

What is claimed is:

1. A multi-device controller for an emergency vehicle warning system comprising:
   a control panel comprising a plurality of activation switches for receiving input from the operator of the emergency vehicle;
   control circuitry responsive to said activation switches for generating control signals for a plurality of first devices, said first devices being indicative of the presence of an emergency;
   an output module having a plurality of first outputs for providing said control signals to said first devices and a dedicated second output for providing a trigger signal to at least one second device being indicative of a response to said emergency; and
   a signal generator configured to generate said trigger signal when a predetermined one or more of said first devices are activated, whereby the controller prevents the operator of the emergency vehicle from activating a first device without triggering activation of the second device.

2. A warning system for an emergency vehicle comprising: the multi-device controller of claim 1 in combination with:
   a plurality of said first devices, the operation of said first devices being indicative of the presence of an emergency; and
   one or more of said second devices, said second devices operating in response to said trigger signal.

3. The warning system of claim 2, wherein said dedicated output is coupled to a plurality of second devices.

4. The warning system of claim 3, wherein said dedicated output is coupled to said plurality of second devices via an optical connector.

5. The warning system of claim 4, wherein said optical connector comprises a light emitting diode and a photo sensor.

6. The warning system of claim 3, wherein said dedicated output is coupled to said plurality of second devices via a wireless connector.

7. The warning system of claim 6, wherein said wireless connector operates using Bluetooth technology.

8. The warning system of claim 2, wherein at least one of said first devices comprises a siren.

9. The warning system of claim 2, wherein at least one of said first devices comprises a gun lock.

10. The warning system of claim 2, wherein at least one of said first devices comprises warning lights.

11. The warning system of claim 2, wherein at least one of said first devices comprises a trunk lock.

12. The warning system of claim 2, wherein at least one of said second devices comprises a video camera.

13. The warning system of claim 2, wherein at least one of said second devices comprises a radio.

14. The warning system of claim 2, wherein at least one of said second devices comprises an audio recorder.

15. The warning system of claim 2, wherein at least one of said second devices comprises a vehicle locator.

16. The warning system of claim 2, wherein said signal generator is programmable.

17. The warning system of claim 16, wherein said signal generator is programmable via the control panel upon activation of a switch internal to said controller.

18. The multi-device controller of claim 1, further comprising:
   at least one diagnostic device functionally located between said control circuitry and said output module.

19. The warning system of claim 18, wherein said at least one diagnostic device comprises a fuse.

20. The warning system of claim 18, wherein said at least one diagnostic device comprises a plurality of visual indicators.

21. The warning system of claim 20, wherein said visual indicators comprise light emitting diodes.

22. The warning system of claim 20, wherein the particular pattern of said visual indicators in operation is indicative of a particular operating status of said warning system.

23. The warning system of claim 18, wherein said at least one diagnostic device comprises an audible indicator.

24. The multi-device controller of claim 1, wherein said plurality of first devices includes a plurality of warning lights and said second device comprises a video camera.

25. A warning system for an emergency vehicle comprising:
   a plurality of first devices, the operation of said first devices being indicative of the presence of an emergency;
   one or more second devices, said second devices operating in response to an input signal, the operation of said second devices being indicative of a response to said emergency;
   a control panel for receiving input from the operator of the emergency vehicle; and
   a controller configured to control the operation of said plurality of first devices based on the input from the operator of the emergency vehicle, wherein said controller includes a signal generator and a dedicated output for selectively applying said input signal to at least one of said second devices in response to the initiation of operation of a predetermined one or more of said first devices;
   wherein said controller further comprises:
   at least one circuit for operating said plurality of first devices;
   at least one output device for coupling said at least one circuit to said plurality of first devices; and
   at least one diagnostic device functionally located between said at least one circuit and said at least one output device.

* * * * *